United States Patent [19]

Denzinger et al.

[11] Patent Number: 4,956,421

[45] Date of Patent: Sep. 11, 1990

[54] PREPARATION OF OXYALKYLATED, CARBOXYL-CONTAINING POLYMERS

[75] Inventors: Walter Denzinger, Speyer; Heinrich Hartmann, Limburgerhof; Richard Baur, Mutterstadt; Johannes Perner, Neustadt; Wolfgang Trieselt, Ludwigshafen; Horst Trapp, Plankstadt; Hans-Juergen Raubenheimer, Ketsch, all of Fed. Rep. of Germany

[73] Assignee: BASF Aktiengesellschaft, Ludwigshafen, Fed. Rep. of Germany

[21] Appl. No.: 367,680

[22] Filed: Jun. 19, 1989

[30] Foreign Application Priority Data

Jun. 25, 1988 [DE] Fed. Rep. of Germany ....... 3821518

[51] Int. Cl.$^5$ ................................................ C08F 8/00
[52] U.S. Cl. ................................. 525/385; 525/327.4; 525/329.6; 525/329.7; 525/329.8; 525/343; 525/350; 525/354
[58] Field of Search ................ 525/385, 343, 350, 354

[56] References Cited

U.S. PATENT DOCUMENTS 2,607,761 8/1952 Seymour.
3,880,765 4/1975 Watson.
4,814,102 3/1989 Baur et al. .......................... 252/180

FOREIGN PATENT DOCUMENTS 0200070 11/1986 European Pat. Off..
12976 9/1956 Fed. Rep. of Germany.
1002343 8/1965 United Kingdom.

Primary Examiner—Bernard Lipman
Attorney, Agent, or Firm—Oblon, Spivak, McClelland, Maier & Neustadt

[57] ABSTRACT

Oxyalkylated, carboxyl-containing polymers are prepared by reacting
(A) a polymer which contains one or more monoethylenically unsaturated $C_3$–$C_6$-carboxylic acids as copolymerized units with
(B) an alkylene oxide in an aqueous medium at not more than 120° C. by a process in which the reaction is started at a pH of from 5.0 to 5.9 and is ended after a pH of from 5.5 to 8.5 has been reached. As a result of monitoring of the pH, the selectivity of the addition reaction of alkylene oxides with the polymers (A) is substantially improved compared with known processes.

9 Claims, No Drawings

PREPARATION OF OXYALKYLATED, CARBOXYL-CONTAINING POLYMERS

U.S. Pat. No. 3,880,765 discloses a process for the preparation of oxyalkylated water-soluble polymers of acrylic acid. According to a process variant described in the U.S. Patent, polymers of acrylic acid are reacted with from 2 to 60% by weight, based on the polymer used, of an alkylene oxide, preferably ethylene oxide, in an aqueous medium. After the end of the oxyalkylation, the reaction product is neutralized. In the oxyalkylation of polymers in an aqueous medium, however, glycols are formed as byproducts by reaction of the alkylene oxides with water.

U.S. application Ser. No. 07/175,176 now U.S. Pat. No. 4,814,102, granted Mar. 21, 1989, furthermore discloses that adducts of ethylene oxide, propylene oxide or butylene oxides with carboxyl-containing polymers which contain one or more monoethylenically unsaturated $C_3$–$C_6$-carboxylic acids as copolymerized units can be used as additives for detergents. In the wash liquor, the adducts act as incrustation inhibitors and as dispersants for the dirt particles detached during washing of the linen. According to the examples, they are prepared by reacting alkylene oxides with polymers in aqueous solution in the presence of thiodiglycol or ethylthioethanol at a pH of from 0.7 to 4.5. Alkylene glycols are formed as byproducts.

It is an object of the present invention greatly to suppress the formation of the alkylene glycols formed as byproducts in the oxyalkylation of carboxyl-containing polymers with alkylene oxides in aqueous medium, in comparison with the known process.

We have found that this object is achieved, according to the invention, by a process for the preparation of oxyalkylated, carboxyl-containing polymers by reacting (A) a polymer which contains one or more monoethylenically unsaturated $C_3$–$C_6$-carboxylic acids as copolymerized units with (B) ethylene oxide, propylene oxide, n-butylene oxide, isobutylene oxide or a mixture of these in aqueous medium at not more than 120° C. if the reaction is started at a pH of from 5.0 to 5.9 and is ended after a pH of from 5.5 to 8.5 has been reached. The reaction of the polymers (A) with the alkylene oxides (B) is preferably carried out in the presence of a thioether or an SH-containing compound as a catalyst.

Suitable polymers (A) are homopolymers of monoethylenically unsaturated $C_3$–$C_6$-carboxylic acids or copolymers which contain not less than 10% by weight of a monoethylenically unsaturated $C_3$–$C_6$-carboxylic acid as copolymerized units. Examples of suitable monoethylenically unsaturated carboxylic acids of this type are acrylic acid, methacrylic acid, ethacrylic acid, vinylacetic acid, allylacetic acid, propylideneacetic acid, ethylidenepropionic acid, mesaconic acid, fumaric acid, methylenemalonic acid, citraconic acid, maleic acid and itaconic acid. Of the stated carboxylic acids, acrylic acid, methacrylic acid, maleic acid, fumaric acid, itaconic acid or a mixture of these is preferably used.

Other suitable polymers (A) are copolymers which contain (a) monoethylenically unsaturated $C_3$–$C_6$-monocarboxylic acids and (b) monoethylenically unsaturated $C_4$–$C_6$-dicarboxylic acids as copolymerized units.

Acrylic acid and/or methacrylic acid are preferably used as monomers of group (a). Monomers of group (b) are, for example, maleic acid, itaconic acid, mesaconic acid, fumaric acid, methylmalonic acid and citraconic acid. From this group of monomers, maleic acid is preferably used. The copolymers contain from 1 to 99% by weight of the monomers of group (a) and from 99 to 1% by weight of the monomers of group (b) as copolymerized units.

The carboxyl-containing copolymers can be modified by copolymerization of further monomers. Copolymers of this type contain, in polymerized form, (a) from 5 to 40% by weight of one or more monoethylenically unsaturated $C_3$–$C_6$-monocarboxylic acids, preferably acrylic acid and/or methacrylic acid, (b) from 5 to 40% by weight of one or more monoethylenically unsaturated dicarboxylic acids of 4 to 6 carbon atoms, preferably maleic acid and/or itaconic acid, (c) from 0 to 80% by weight of one or more hydroxy-$C_2$–$C_6$-alkyl esters of mono- or dicarboxylic acids according to (a) and (b) and (d) from 0 to 20% by weight of one or more amides, nitriles or esters of monohydric alcohols of 1 to 4 carbon atoms with mono- or dicarboxylic acids according to (a) and (b), vinyl acetate, vinyl propionate, vinylphosphonic acid, vinyl sulfonate and/or acrylamido-2-methylpropanesulfonic acid.

The sum of the percentages by weight (a) to (d) is always 100. Suitable monomers (c) are, for example, hydroxyethyl acrylate, hydroxyethyl methacrylate, hydroxypropyl acrylate, hydroxypropyl methacrylate, hydroxybutyl acrylate, hydroxybutyl methacrylate, hydroxyhexyl acrylate, monohydroxyethyl maleate, dihydroxyethyl maleate, monohydroxypropyl maleate, dihydroxypropyl maleate, monohydroxybutyl maleate, dihydroxybutyl maleate, monohydroxyethyl itaconate, dihydroxyethyl itaconate, monohydroxypropyl itaconate, dihydroxypropyl itaconate and monohydroxybutyl itaconate. Among the hydroxyalkyl esters which are derived from diols of 3 to 6 carbon atoms, all isomers can be used. Preferably used monomers of group (c) are hydroxyethyl acrylate, hydroxyethyl methacrylate, hydroxypropyl acrylate, hydroxybutyl acrylate and hydroxypropyl methacrylate. If the monomers of group (c) are used, they are preferably present in the copolymers in an amount of from 20 to 60% by weight.

Examples of suitable components (d) are acrylamide, methacrylamide, acrylonitrile, methacrylonitrile, acrylates of alcohols of 1 to 4 carbon atoms, e.g. methyl acrylate, ethyl acrylate, n-propyl acrylate, isopropyl acrylate, n-butyl acrylate, isobutyl acrylate and tertbutyl acrylate, and the corresponding esters of methacrylic acid and monoesters of dicarboxylic acids, such as monomethyl maleate, dimethyl maleate, monoethyl maleate, mono-n-propyl maleate, diisopropyl maleate, mono- n-butyl maleate, mono-sec-butyl maleate, di-n-propyl maleate, di-n-butyl maleate and di-sec-butyl maleate, and the corresponding esters of fumaric acid and itaconic acid, vinyl acetate, vinyl propionate, vinylphosphonic acid, vinylsulfonic acid and/or acrylamido-2-methylpropanesulfonic acid. If the copolymers are modified with monomers of group (d), the amount of the monomers of group (d) in the copolymers is not more than 20, preferably from 5 to 15, % by weight.

The abovementioned homopolymers and copolymers have weight average molecular weights of from 500 to 1 million, preferably from 10,000 to 500,000. Instead of being characterized by the molecular weight, the polymers are characterized below by the Fikentscher K value. The K value of the homopolymers and copolymers is from 8 to 200, preferably from 15 to 100. It is determined according to H. Fikentscher in 1% aqueous solution at a pH of 7, at 25° C. and at a polymer concentration of the sodium salt of the polymer of 1% by weight.

The polymers (A) described above and containing not less than 10% by weight of a monoethylenically unsaturated $C_3$-$C_6$-carboxylic acid as copolymerized units are reacted with alkylene oxides in an aqueous medium. For this purpose, they are preferably dissolved in an aqueous medium. The polymer concentration is from 5 to 90, preferably from 20 to 70, % by weight. A preferably used aqueous medium is pure water, for example river water freed from suspended substances, deionized water or distilled water. Other aqueous media are mixtures of water and solvents which are soluble in water, for example alcohols, such as methanol, ethanol, n-propanol and isopropanol, acetone, dimethylformamide, dioxane and tetrahydrofuran. The water-miscible solvents are used in particular when the polymers (A) are not completely soluble in water. It is of course also possible to use mixtures of organic solvents and water as the aqueous medium. Solvent mixtures contain not more than 50% by weight of organic solvents.

The polymers of group (A) are reacted with the alkylene oxides stated above under (B). These alkylene oxides are ethylene oxide, propylene oxide, n-butylene oxide, isobutylene oxide or a mixture of the stated alkylene oxides. The reaction of the polymers with alkylene oxides is carried out in an aqueous medium at ° from 5° to 120° C., preferably from 20 to 80° C., under atmospheric or superatmospheric pressure. If the reaction is carried out under superatmospheric pressure, the pressure is not more than 50 bar. The reaction is usually carried out under not more than 20 bar. The alkylene oxide or a mixture of the alkylene oxides is subjected to an addition reaction with the polymers. From 3 to 80, preferably 4 to 50, % by weight, based on the polymers (A) of the alkylene oxides stated under (B) are used.

A critical factor for suppressing glycol formation in the reaction of the carboxyl-containing polymers with the suitable alkylene oxides is monitoring of the pH during the oxyalkylation. The pH of the aqueous solution of the polymer, determined in each case at 20° C., should be from 5.0 to 5.9 at the beginning of the reaction and from 5.5 to 8.5 at the end of the reaction. It is adjusted by partial neutralization of the carboxyl-containing polymers with bases. Examples of suitable bases are bases derived from alkali metals, such as sodium hydroxide solution, potassium hydroxide solution, sodium carbonate, sodium bicarbonate and potassium carbonate. Ammonia and amines, for example $C_1$-$C_{18}$-alkylamines, such as ethylamine, propylamine, butylamine, dibutylamine, triethylamine, hexylamine, stearylamine, ethanolamine, diethanolamine, triethanolamine and morpholine, are also suitable. If the alkaline earth metal salts of the polymers are water-soluble, bases derived from alkaline earth metals, e.g. magnesium carbonate and calcium hydroxide, can also be used for partial neutralization of the carboxyl or $SO_3H$ groups of the polymers. It is sometimes advantageous to use mixtures of bases. Sodium hydroxide and potassium hydroxide are preferred.

The pH of the reaction mixture is continuously monitored during the reaction. As a result of the reaction of the alkylene oxides with the free carboxyl groups of the polymers to give hydroxyalkyl ester groups, the pH of the reaction mixture increases as the reaction progresses. Preferably, the oxyalkylation is started at a pH of from 5.2 to 5.9 and the reaction is ended at a pH of from 5.6 to 7.5. The pH increases by not less than 0.2, preferably not less than 0.4, unit in the course of the reaction.

The selectivity of the addition reaction of the alkylene oxides with the polymers (A) in an aqueous medium is further increased by carrying out the reaction of the polymers (A) and the alkylene oxides (B) in the presence of from 0.5 to 5% by weight, based on the alkylene oxides used, of thioethers or SH-containing compounds. Examples of suitable thioethers are those of the general formula R-S-$R^1$, where R and $R^1$ are each $C_1$-$C_{10}$-alkyl, $-C_6H_5$, $-CH_2-C_6H_5$, $-CH_2-COOH$, $-CH_2-(CH_2)_n-COOH$ or $-(CH_2)_n-CH_2-OH$ and n is from 1 to 8. Examples of such thioethers are dimethyl sulfide, diethyl sulfide, methyl phenyl sulfide, thiodiacetic acid, thiodibutyric acid, ethylthioethanol and thiodiglycol. Thioglycol, thioethanol, thioacetic acid, thiobutyric acid and dodecyl mercaptan are also suitable. Particularly preferred is the preparation of oxyalkylated copolymers which are obtainable by reacting (A) a copolymer which contains, as copolymerized units,
  (a) from 40 to 90% by weight of acrylic acid and/or methacrylic acid and
  (b) from 60 to 10% by weight of maleic acid and/or itaconic acid, the sum of the percentages by weight (a) and (b) always being 100, with
(B) from 3 to 80, preferably from 4 to 50, % by weight, based on (A) of propylene oxide in the presence of from 0.5 to 5% by weight, based on propylene oxide, of thiodiglycol, thiodiacetic acid or a mixture of these.

The reaction is preferably carried out under superatmospheric pressure. In this procedure, either some or all of the copolymer (A) is initially placed in the autoclave as a solution in an aqueous medium and some or all of the alkylene oxide is then forced in. In order to be able to remove the heat of reaction, the alkylene oxide is metered in a little at a time or continuously, depending on the progress of the reaction. Advantageously, thorough mixing of the components is ensured during the total duration of the reaction, for example by stirring. Autoclaves equipped with a stirrer and with heating and cooling means are preferably used. In some cases it is advantageous to add the alkylene oxide at a low temperature and then to increase the temperature for complete reaction, for example to meter in the alkylene oxide at 40° C. and then allow the reaction to continue at 80° C. The reaction is preferably carried out at from 20° to 80° C. After the end of the reaction, oxyalkylated carboxyl-containing polymers which have only small amounts of alkylene glycols and can be used directly in this form or after neutralization are obtained. However, the reaction products can also be isolated from the aqueous solutions and can be used in solid form, for example as pellets or flakes.

The oxyalkylated carboxyl-containing polymers are mainly used as additives for detergents and are present therein in an amount of from 0.1 to 20, preferably from 1 to 15, % by weight. In wash liquors, they act as builders, as incrustation inhibitors and as dispersants for dirt particles which are detached from the textile material and are present in the wash liquor.

The oxyalkylated, carboxyl-containing polymers can be added to both phosphate-containing and phosphate-free detergents. The phosphorus-containing detergents have a reduced phosphate content of less than 25% by weight of sodium triphosphate. The oxyalkylated polymers are added, to the detergent formulation, in the form of a solution or as a mixture with other components, for example together with standardizing agents, such as sodium sulfate, or builders (zeolites) or other assistants. The products to be used according to the invention can be added both to powder detergents and to liquid detergent formulations. Essential components of commercial, powder or liquid detergents, which either contain sodium triphosphate or are phosphate-free, are surfactants, for example, $C_8$–$C_{12}$-alkylphenol oxyethylates, $C_{12}$–$C_{20}$-alkanol oxyethylates and block copolymers of ethylene oxide and propylene oxide. The surfactants are present therein in an amount of from 5 to 50% by weight.

The K values of the carboxyl-containing polymers were measured according to H. Fikentscher, Cellulose-chemie, 13 (1932), 58–64 and 71–74, in aqueous solution at 25° C., at a polymer concentration of 1% by weight of the sodium salt and at a pH of 7; $K = k \cdot 10^3$.

EXAMPLES

All reactions were carried out in stainless steel kettles designed for operation under high pressure and equipped with an anchor stirrer. The kettles were furthermore equipped with a metering apparatus for alkylene oxide and were heatable and coolable. The capacity of the kettles used in each case is stated in the Table below. In the Examples and Comparative Examples, the aqueous polymer solution designated in each case in the Table was introduced, 3×3 bar of nitrogen were forced in and each kettle was brought to a nitrogen pressure of 1 bar. The kettle content was then heated to 40° C. with thorough stirring. The temperature was kept constant and propylene oxide was metered in uniformly in the course of 1.5 hours. After the addition of the propylene oxide, the reaction mixture was stirred for a further hour at the reaction temperature. Thereafter, the temperature was increased to 60° C. and the reaction mixture was stirred until the pressure had fallen to 1 bar (this takes about 2 hours). The autoclave content was then let down and was freed from minor amounts of unconverted propylene oxide under slightly reduced pressure (about 800 mbar).

In Examples 1 to 8 and Comparative Examples 1 to 3, the aqueous solution of a copolymer of 70% by weight of acrylic acid and 30% by weight of maleic acid, having a K value of 66.2, was used, the said aqueous solution having been brought to the pH stated in the Table with sodium hydroxide. In Example 9, an aqueous solution of a copolymer of 50% by weight of acrylic acid and 50% by weight of maleic acid, having a K value of 54.5, was initially taken in the reactor, the said aqueous solution having been adjusted with sodium hydroxide.

The solids content of the aqueous solution was determined in each case by drying 0.5 g of the reaction mixture in a 20 ml weighing glass for 2 hours at 150° C.

The propylene glycol content of the samples was determined by gas chromatography. The pH of the aqueous solutions was measured in each case by taking a sample from the reactor and measuring with a pH meter by an electrical method at a sample temperature of 20° C. The results of the Examples and Comparative Examples are summarized in the Table.

TABLE

| | Aqueous copolymer solution initially taken in reactor | | | | | | Reaction product | |
|---|---|---|---|---|---|---|---|---|
| | Reactor content [l] | Amount [g] | Solids content [% by weight] | pH [at the beginning] | Catalyst Thiodiglycol [g] | Propylene oxide [g] | Solids content [% by wt.] | pH (at the end) |
| Example No. | | | | | | | | |
| 1 | 6 | 3445 | 43.5 | 5.0 | 5.2 | 261.5 | 48.2 | 5.7 |
| 2 | 160 | 123400 | 43.1 | 5.2 | 190 | 8940 | 46.1 | 6.4 |
| 3 | 6 | 3396 | 43.2 | 5.3 | 2.5 | 127 | 45.6 | 5.6 |
| 4 | 10 | 4260 | 44.0 | 5.6 | 6.4 | 317.4 | 46.0 | 8.4 |
| 5 | 160 | 128200 | 42.4 | 5.6 | 190 | 8940 | 45.2 | 8.1 |
| 6 | 6 | 3554 | 42.3 | 5.9 | 5 | 249.5 | 46.1 | 7.5 |
| 7 | 6 | 3391 | 42.6 | 5.3 | — | 253 | 47.6 | 6.0 |
| 8 | 6 | 3363 | 43.2 | 5.3 | 5 | 251 | 48.1 | 6.1 |
| 9 | 6 | 4091 | 41.3 | 5.4 | 5.9 | 294 | 45.2 | 7.4 |
| Comparative Example No. | | | | | | | | |
| 1 | 10 | 5178 | 45.3 | 3.9 | 633.5 | 261.5 | 49.8 | 5.0 |
| 2 | 10 | 3645 | 44.0 | 4.9 | 400.9 | 261.5 | 48.5 | 6.0 |
| 3 | 10 | 3841 | 43.8 | 5.9 | 387.4 | 261.5 | 46.3 | 10.5 |

| | Propylene glycol content [% by wt. based on solids] | Amount of propylene oxide added to copolymer [% by wt.] | K value |
|---|---|---|---|
| Example No. | | | |
| 1 | 1.3 | 85.8 | 66.4 |
| 2 | 0.48 | 94.4 | 63.2 |
| 3 | 0.09 | 97.5 | 66.0 |
| 4 | 0.61 | 93.2 | 64.3 |
| 5 | 0.2 | 97.7 | 62.4 |
| 6 | 0.43 | 94.4 | 65.5 |
| 7 | 1.16 | 87.3 | 66.1 |

TABLE-continued

| Aqueous copolymer solution initially taken in reactor | | | |
|---|---|---|---|
| 8 | 0.56 | 93.8 | 66.2 |
| 9 | 0.03 | 99.6 | 55.0 |
| Comparative Example No. | | | |
| 1 | 3.7 | 74.3 | 66.7 |
| 2 | 3.2 | 75.3 | 65.9 |
| 3 | 2.5 | 79.2 | 63.2 |

In Example 8, the reaction temperature was 60° C.

We claim:

1. A process for the preparation of an oxyalkylated, carboxyl-containing polymer, wherein
   (A) a polymer which contains one or more monoethylenically unsaturated $C_3$–$C_6$-carboxylic acids as copolymerized units is reacted with
   (B) ethylene oxide, propylene oxide, n-butylene oxide, isobutylene oxide or a mixture of these in an aqueous medium at not more than 120° C., the reaction being started at a pH of from 5.0 to 5.9 and being ended after a pH of from 5.5 to 8.5 has been reached.

2. A process as claimed in claim 1, wherein the reaction of (A) with (B) is carried out in the presence of a thioether or an SH-containing compound as a catalyst.

3. A process as claimed in claim 1 or 2, wherein the polymer (A) used is a homopolymer of a monoethylenically unsaturated $C_3$–$C_6$-carboxylic acid.

4. A process as claimed in claim 1 or 2, wherein the polymer (A) used is a copolymer which contains, as copolymerized units,
   (a) from 1 to 99% by weight of one or more monoethylenically unsaturated $C_3$–$C_6$-monocarboxylic acids and
   (b) from 99 to 1% by weight of one or more monoethylenically unsaturated $C_4$–$C_6$-dicarboxylic acid, with the proviso that the sum of the percentages by weight (a) and (b) is always 100.

5. A process as claimed in claim 1 or 2, wherein
   (A) a copolymer which contains, as copolymerized units,
      (a) from 40 to 90% by weight of acrylic acid and/or methacrylic acid and
      (b) from 60 to 10% by weight of maleic acid and/or itaconic acid, the sum of the percentages by weight (a) and (b) always being 100, is reacted with
   (B) from 3 to 80% by weight, based on (A) of propylene oxide in the presence of from 0.5 to 5% by weight, based on propylene oxide, of thiodiglycol and/or thiodiacetic acid.

6. A process as claimed in claim 1 or 2, wherein the K value of the homopolymers and copolymers (B) is from 8 to 200 (measured according to H. Fikentscher in aqueous solution at 25° C., at a pH of 7 and at a concentration of the Na salt of the polymers of 1% by weight).

7. A process as claimed in claim 1 or 2, wherein the K value of the homopolymers and copolymers (B) is from 15 to 100 (measured according to H. Fikentscher in aqueous solution at 25° C., at a pH of 7 and at a concentration of the Na salt of the polymers of 1% by weight).

8. A process as claimed in claim 1, wherein the pH increases by not less than 0.2 unit in the course of the reaction of (A) with (B).

9. A process as claimed in claim 1, wherein the pH increases by not less than 0.4 unit in the course of the reaction of (A) with (B).

* * * * *